(12) United States Patent
Kodama et al.

(10) Patent No.: US 11,190,702 B2
(45) Date of Patent: Nov. 30, 2021

(54) IMAGE-CAPTURING APPARATUS

(71) Applicant: SONY CORPORATION, Tokyo (JP)

(72) Inventors: Yasuhiro Kodama, Tokyo (JP); Makoto Omata, Kanagawa (JP); Akira Iwase, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/641,678

(22) PCT Filed: Jul. 10, 2018

(86) PCT No.: PCT/JP2018/025991
§ 371 (c)(1),
(2) Date: Feb. 25, 2020

(87) PCT Pub. No.: WO2019/049504
PCT Pub. Date: Mar. 14, 2019

(65) Prior Publication Data
US 2020/0389580 A1    Dec. 10, 2020

(30) Foreign Application Priority Data
Sep. 5, 2017    (JP) .............................. JP2017-170207

(51) Int. Cl.
*H04N 5/235*    (2006.01)
*H04N 7/18*    (2006.01)
*H04N 5/225*    (2006.01)

(52) U.S. Cl.
CPC ........... *H04N 5/2352* (2013.01); *H04N 7/183* (2013.01); *H04N 5/2252* (2013.01)

(58) Field of Classification Search
CPC .... H04N 5/2352; H04N 7/183; H04N 5/2252; H04N 9/735; H04N 13/19636;
(Continued)

(56) References Cited

U.S. PATENT DOCUMENTS

| | | | | |
|---|---|---|---|---|
| 2004/0066463 | A1* | 4/2004 | Butterworth | ....... G02B 13/0015 348/340 |
| 2014/0056601 | A1* | 2/2014 | Furuta | ................ G03G 15/5062 399/15 |
| 2019/0253592 | A1* | 8/2019 | Rees | ..................... H04N 1/6086 |

FOREIGN PATENT DOCUMENTS

| | | |
|---|---|---|
| JP | 09-93593 A | 4/1997 |
| JP | 09-093593 A | 4/1997 |

(Continued)

OTHER PUBLICATIONS

International Search Report and Written Opinion of PCT Application No. PCT/JP2018/025991, dated Aug. 21, 2018, 07 pages of ISRWO.

*Primary Examiner* — Jason A Flohre
(74) *Attorney, Agent, or Firm* — Chip Law Group

(57) ABSTRACT

An image-capturing apparatus according to an embodiment of the present technology includes a camera, a lighting section, a sensor section, and an image-shooting controller. The lighting section includes a light entrance that at least a portion of external light enters, and an object for calibration that is irradiated with the external light entering the light entrance. The sensor section detects a state of the object for calibration irradiated with the external light. The image-shooting controller controls the camera according to a result of the detection performed by the sensor section.

18 Claims, 12 Drawing Sheets

(58) Field of Classification Search
CPC ............ H04N 5/247; H04N 5/232061; H04N 5/23299; H04N 17/002; H04N 5/243; H04N 9/04; G08B 13/19636; G08B 13/19608; G08B 13/1963; G03B 7/099; G03B 15/00; G03B 17/56
See application file for complete search history.

(56) References Cited

FOREIGN PATENT DOCUMENTS

| | | | |
|---|---|---|---|
| JP | 2002-094868 A | 3/2002 |
| JP | 2003-324749 A | 11/2003 |
| JP | 2005-277629 A | 10/2005 |
| JP | 2013-090885 A | 5/2013 |

* cited by examiner

IMAGE-CAPTURING APPARATUS

CROSS REFERENCE TO RELATED APPLICATIONS

This application is a U.S. National Phase of International Patent Application No. PCT/JP2018/025991 filed on Jul. 10, 2018, which claims priority benefit of Japanese Patent Application No. JP 2017-170207 filed in the Japan Patent Office on Sep. 5, 2017. Each of the above-referenced applications is hereby incorporated herein by reference in its entirety.

TECHNICAL FIELD

The present technology relates to an image-capturing apparatus that is applicable to, for example, a monitoring camera.

BACKGROUND ART

In the remote-control platform system disclosed in Patent Literature 1, a white balance, a black balance, or the like is automatically adjusted when a full-automatic switch is turned on. When a white balance is adjusted, a white plate is moved up to a light path of image-shooting performed using a camera, and when a white balance is not adjusted, the white plate is moved to another position from the image-shooting light path (for example, paragraphs [0024] and [0025] of the specification and FIG. 4 in Patent Literature 1).

CITATION LIST

Patent Literature

Patent Literature 1: Japanese Patent Application Laid-open No. 2002-94868

DISCLOSURE OF INVENTION

Technical Problem

In, for example, a monitoring camera, it is important to consecutively perform image-shooting on a subject with a high degree of accuracy.

In view of the circumstances described above, it is an object of the present technology to provide an image-capturing apparatus that makes it possible to consecutively perform image-shooting on a subject with a high degree of accuracy.

Solution to Problem

In order to achieve the object described above, an image-capturing apparatus according to an embodiment of the present technology includes a camera, a lighting section, a sensor section, and an image-shooting controller.

The lighting section includes a light entrance that at least a portion of external light enters, and an object for calibration that is irradiated with the external light entering the light entrance.

The sensor section detects a state of the object for calibration irradiated with the external light.

The image-shooting controller controls the camera according to a result of the detection performed by the sensor section.

In this image-capturing apparatus, at least a portion of the external light is irradiated onto the object for calibration through the light entrance of the lighting section. A state of the object for calibration irradiated with the external light is detected, and the camera is controlled according to a result of the detection. This makes it possible to consecutively perform image-shooting on a subject with a high degree of accuracy.

The external light may include illumination light that is emitted from a light source that illuminates an image-shooting range of the camera.

The image-capturing apparatus may further include a change section that is capable of changing an image-shooting direction of the camera. In this case, according to the image-shooting direction changed by the change section, the sensor section may variably set, with respect to the object for calibration, a detection region that is a detection target.

The change section may rotate the camera about a specified axis. In this case, the object for calibration may be arranged to surround the specified axis. The sensor section may include a sensor that is rotatable about the specified axis, and may rotate the sensor such that a rotational position of the sensor with respect to the specified axis substantially coincides with a rotational position of the camera with respect to the specified axis.

The sensor section may set, to be the detection region, a region of the object for calibration depending on a rotational position of the camera with respect to the specified axis.

The subject for calibration may include a tapered surface that is tilted in a direction away from the specified axis.

The sensor section may include a camera for detection that performs image-shooting on the object for calibration. In this case, the image-shooting controller may control the camera using an image signal generated by the camera for detection.

The image-shooting controller may control at least one of a white balance or an ISO speed of an image shot using the camera.

The image-capturing apparatus may further include a casing that includes an upper portion and a lower portion. In this case, the light entrance may be provided to the upper portion of the casing.

The casing may include a lateral portion. In this case, the camera may be provided to the lower portion or the lateral portion.

The object for calibration may include a white plate.

The external light may include sunlight.

As described above, the present technology makes it possible to consecutively perform image-shooting on a subject with a high degree of accuracy. Note that the effect described here is not necessarily limitative and may be any effect described in the present disclosure.

MODE(S) FOR CARRYING OUT THE INVENTION

Embodiments according to the present technology will now be described below with reference to the drawings.

First Embodiment

Figure 1:
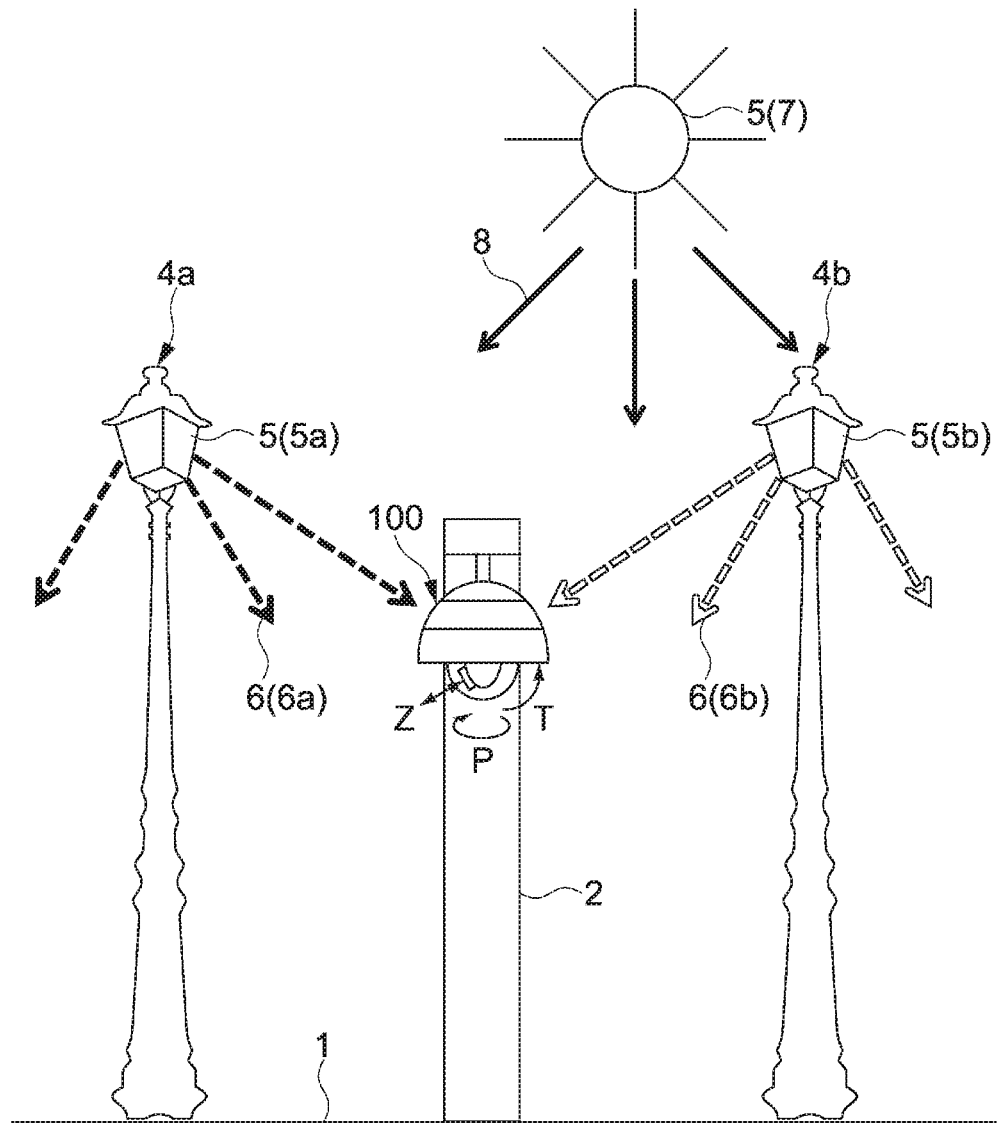
FIG. 1 schematically illustrates an example of arrangement of a monitoring camera 100 according to a first embodiment.

FIG. 1 schematically illustrates an example of arrangement of a monitoring camera 100 according to a first embodiment of present technology. The monitoring camera 100 corresponds to an embodiment of an image-capturing apparatus according to the present technology.

The monitoring camera 100 according to the present embodiment is provided on a tip of a prop 2 that extends upward from a ground 1. The monitoring camera 100 can perform image-shooting on, for example, a person walking on the ground 1 or a vehicle, from above the ground 1 in a downward direction.

The monitoring camera 100 serves as a PTZ camera, and can perform respective operations of panning (an arrow P), a tilt (an arrow T), and a zoom (an arrow Z). In the present embodiment, it is possible to perform an operation of rotating 360 degrees in a panning direction, and an operation of rotating 180 degrees in a tilt direction. Thus, it is possible to perform image-shooting on all of the range from the tip of the prop 2 to the ground 1 as a monitoring area, the range extending around 360 degrees around the prop 2 and extending downward and horizontally 180 degrees on both sides of the prop 2.

In the present embodiment, the monitoring camera 100 is arranged below a light source 5 that illuminates an image-shooting range of the monitoring camera 100, in order not to perform image-shooting against the light when the image-shooting is performed toward the ground 1 situated downward. In other words, the configuration of the monitoring camera 100 is designed on the assumption that the light source 5 illuminating an image-shooting range of the monitoring camera 100 is situated above the monitoring camera 100.

For example, as illustrated in FIG. 1, the prop 2 is provided between a first outdoor light 4a and a second outdoor light 4b. Then, the monitoring camera 100 is provided below the first light source 5a of the first outdoor light 4a and the second light source 5b of the second outdoor light 4b. Note that any light source such as an LED, an incandescent lamp, or a fluorescent light is used as the first and second light sources 5a and 5b.

For example, the first and second outdoor lights 4a and 4b are turned on at a specified time in the evening. The first light source 5a of the first outdoor light 4a is turned on, and first illumination light 6a is irradiated. The second light source 5b of the second outdoor light 4b is turned on, and second illumination light 6b is irradiated. A region around the first outdoor light 4a is primarily illuminated with the first illumination light 6a. A region around the second outdoor light 4b is primarily illuminated with the second illumination light 6b.

In the present embodiment, the first illumination light 6a and the second illumination light 6b correspond to external light. The external light refers to light emitted from a light source external to the monitoring camera 100. For example, even when the monitoring camera 100 and a certain light source are integrated with each other, the certain light source is included in the light source external to the monitoring camera 100. Further, light emitted from the certain light source is included in the external light.

Further, the first illumination light 6a and the second illumination light 6b correspond to illumination light emitted from the light source 5 illuminating an image-shooting range of the monitoring camera 100.

The first and second outdoor lights 4a and 4b are turned off in the daytime. In the daytime, the image-shooting range of the monitoring camera 100 is illuminated with sunlight 8 emitted from the sun 7. For example, the brightness of the image-shooting range differs depending on various weathers such as cloudy weather or rainy weather. In the present embodiment, the sun 7 is included in the light source 5 illuminating the image-shooting range. Further, the sunlight 8 is included in external light and illumination light.

Figure 2:
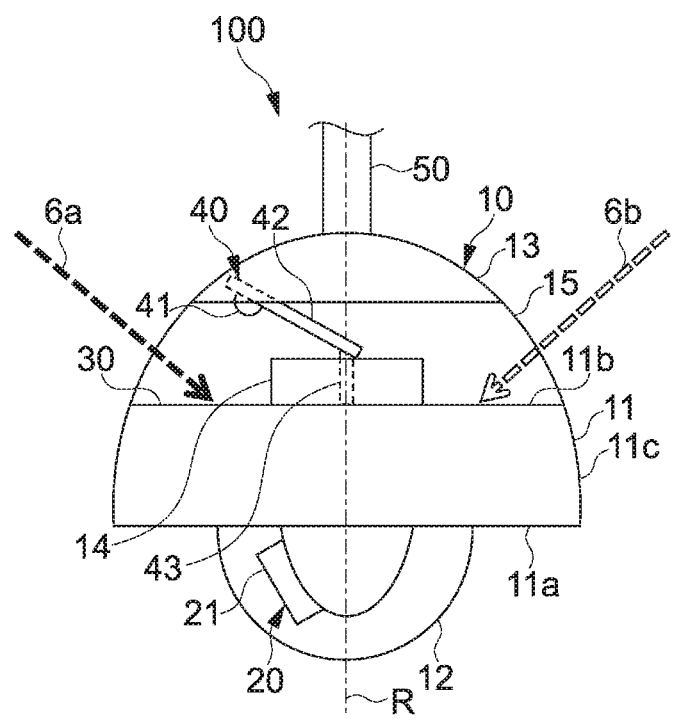
FIG. 2 is a side view illustrating an example of a configuration of the monitoring camera.
Figure 3:
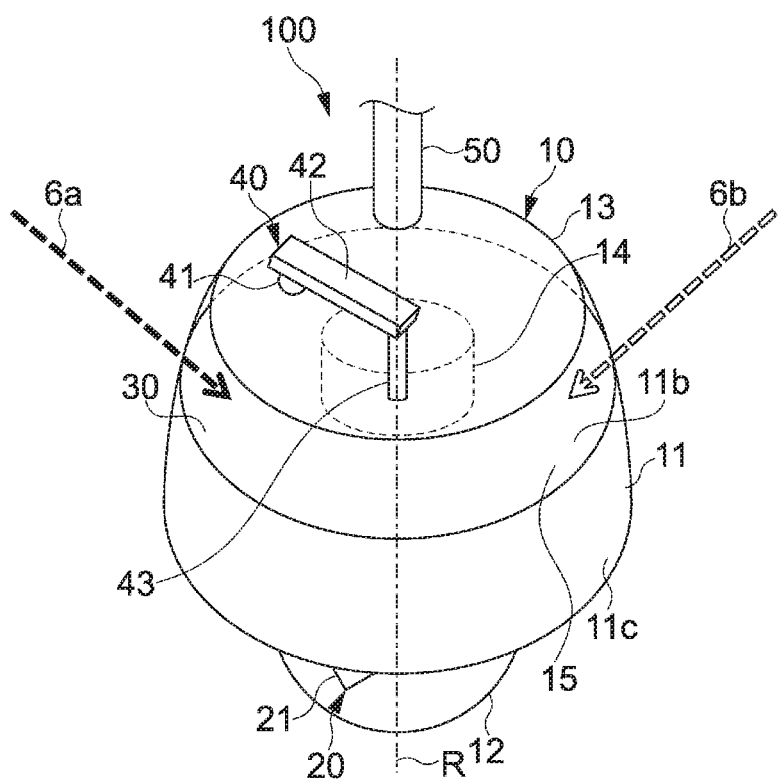
FIG. 3 is a perspective view illustrating the example of the configuration of the monitoring camera.
Figure 4:
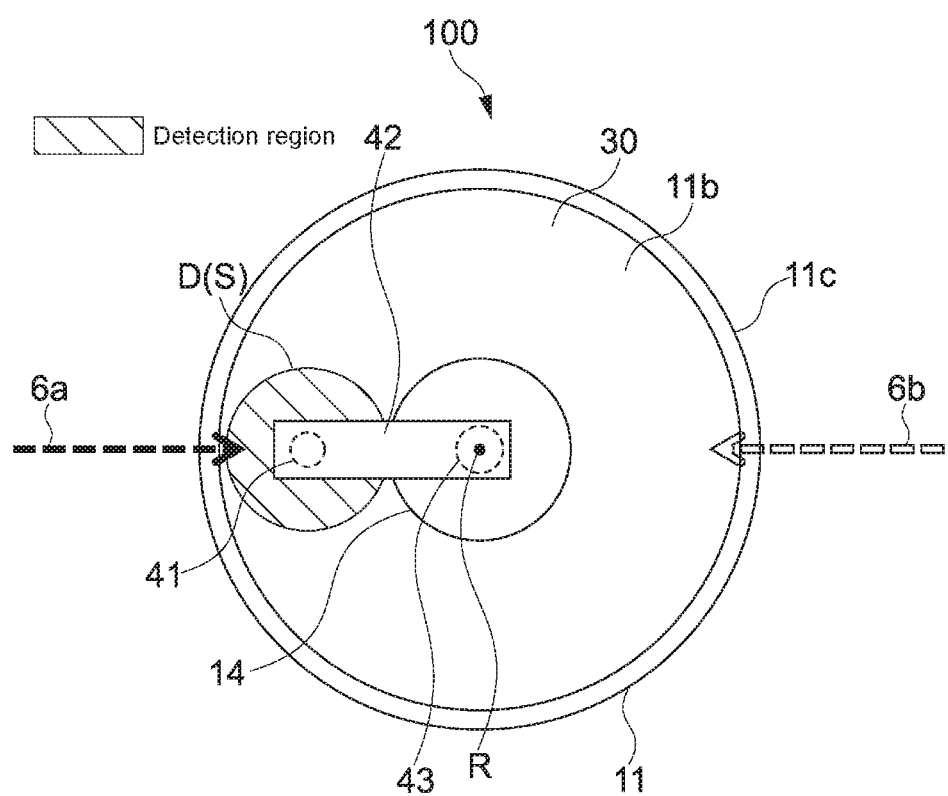
FIG. 4 is a top view illustrating the example of the configuration of the monitoring camera.

FIGS. 2 to 4 schematically illustrate an example of a configuration of the monitoring camera 100. FIG. 2 is a side view of the monitoring camera 100, as viewed from the side, where a portion that is not visually confirmed is indicated by a wavy line. FIG. 3 is a perspective view of the monitoring camera 100, as viewed from diagonally above, where a sub-camera module 40 from among the not visually confirmed portions is indicated by a solid line, and the other portions from among the not visually confirmed portions are indicated by a wavy line.

FIG. 4 is a top view of the monitoring camera 100, as viewed from above, where descriptions of a top cover 13 and a mounting portion 50 illustrated in FIGS. 2 and 3 are omitted.

As illustrated in FIGS. 2 and 3, the monitoring camera 100 includes a casing 10, a main camera module 20, a white plate 30, the sub-camera module 40, and the mounting portion 50.

The casing 10 is a portion that mainly forms an outer body of the monitoring camera 100, and can internally accommodate various components of the monitoring camera 100. In the present embodiment, the casing 10 includes a base portion 11, a camera cover 12, and the top cover 13.

The base portion 11, which is a portion of a base of the monitoring camera 100, is hollow and has a substantially cylindrical shape. The base portion 11 has two faces that face each other, and when the monitoring camera 100 is in a normal mounting pose, as illustrated in, for example, FIG. 1, one of the two faces is a lower face 11a, and the other face is an upper face 11b.

Various boards such as a power supply board, a control board, and a communication board, and a drive mechanism for driving the main camera module 20 and the sub-camera module 40 are configured inside the base portion 11 (between the lower face 11a and the upper face 11b).

Further, as illustrated in FIG. 4, a support base 14 that has a substantially cylindrical shape is provided on the upper face 11b of the base portion 11. The support base 14 is provided in a center portion of the upper face 11b such that the center of the upper face 11b and the center of the support base 14 substantially coincide with each other.

In the present embodiment, a portion situated on the side of the lower face 11a of the base portion 11 corresponds to a lower portion of the casing 10. Further, a portion situated on the side of the upper face 11b of the base portion 11 corresponds to an upper portion of the casing 10.

Typically, when the monitoring camera 100 is in a normal mounting pose, a position situated on the upper side corresponds to an upper portion, and a portion situated on the lower side corresponds to a lower portion. Note that the normal mounting pose refers to a desired mounting pose or a mounting pose similar to the desired mounting pose that is set assuming positions of, for example, a monitoring area and a light source.

The camera cover 12 is provided on the lower face 11a of the base portion 11 to cover a main camera 21. The camera cover 12 has a substantially hemispherical, domical shape, and can cover all of the range in which the main camera 21 is movable in an image-capturing direction of the main camera 21.

The top cover 13 is arranged on the upper face 11b of the base portion 11 to cover all over the upper face 11b and the sub-camera module 40. As illustrated in, for example, FIG. 2, the top cover 13 has a substantially hemispherical, domical shape. The shape of the top cover 13 and the shape of a lateral face 11c of the base portion 11 are designed such that the top cover 13 and the lateral face 11c of the base portion 11 have a single domical shape when the top cover 13 is provided on the base portion 11. This results in an appearance with a high level of design.

In the present embodiment, the lateral face 11c of the base portion 11 is a portion included in a lateral face of the casing 10. Further, it can also be said that a portion in which a lighting window 15 of the top cover 13 is formed is an upper face and the lateral face of the casing 10. The lighting window 15 of the top cover 13 and the like will be described later.

The main camera module 20 is provided on the side of the lower face 11a of the base portion 11. The main camera module 20 includes the main camera 21 and a drive section 22 for performing a PTZ operation of the main camera 21 (refer to FIG. 6). In the present embodiment, the main camera 21 corresponds to a camera.

In the present embodiment, the drive section 22 is configured such that the main camera 21 can rotate 360 degrees about a rotational axis R that passes through an approximate center of the base portion 11 when the base portion 11 is viewed from above (corresponding to an approximate center of the lower face 11a and an approximate center of the upper face 11b). Further, the drive section 22 is configured such that the main camera 21 can rotate in a 180-degree downward range at any rotational position (in any panning direction) with respect to the rotational axis R. Thus, the main camera 21 can perform image-shooting on a substantially hemispherical region downward from the lower face 11a as a monitoring area (an image-capturing range), the substantially hemispherical region extending around 360 degrees and extending downward 180 degrees.

A specific configuration of the drive section 22 is not limited, and, for example, a drive source such as a stepping motor or a linear motor, or any actuator mechanism that includes, for example, a ball screw mechanism, a rack-and-pinion mechanism, a belt mechanism, or a guide mechanism may be used.

The image-capturing direction of the main camera 21 is changed by the main camera 21 being driven by the drive section 22. The image-capturing direction is also considered a direction in which an optical axis of image-shooting performed using the main camera 21 extends. In the present embodiment, the drive section 22 corresponds to a change section that can change the image-shooting direction of the main camera 21. Further, the rotational axis R corresponds to a specified axis.

As illustrated in FIG. 4, the white plate 30 is provided on the upper face 11b of the base portion 11. The white plate 30 has a ring shape, and is provided throughout a region from a peripheral portion of the support base 14 provided in the center portion of the upper face 11b to a peripheral portion of the upper face 11b. Thus, the white plate 30 is arranged to surround the rotational axis R of the main camera 21. The material of the white plate 30 is not limited, and any material may be used. In the present embodiment, the white plate 30 corresponds to an object for calibration.

Figure 6:
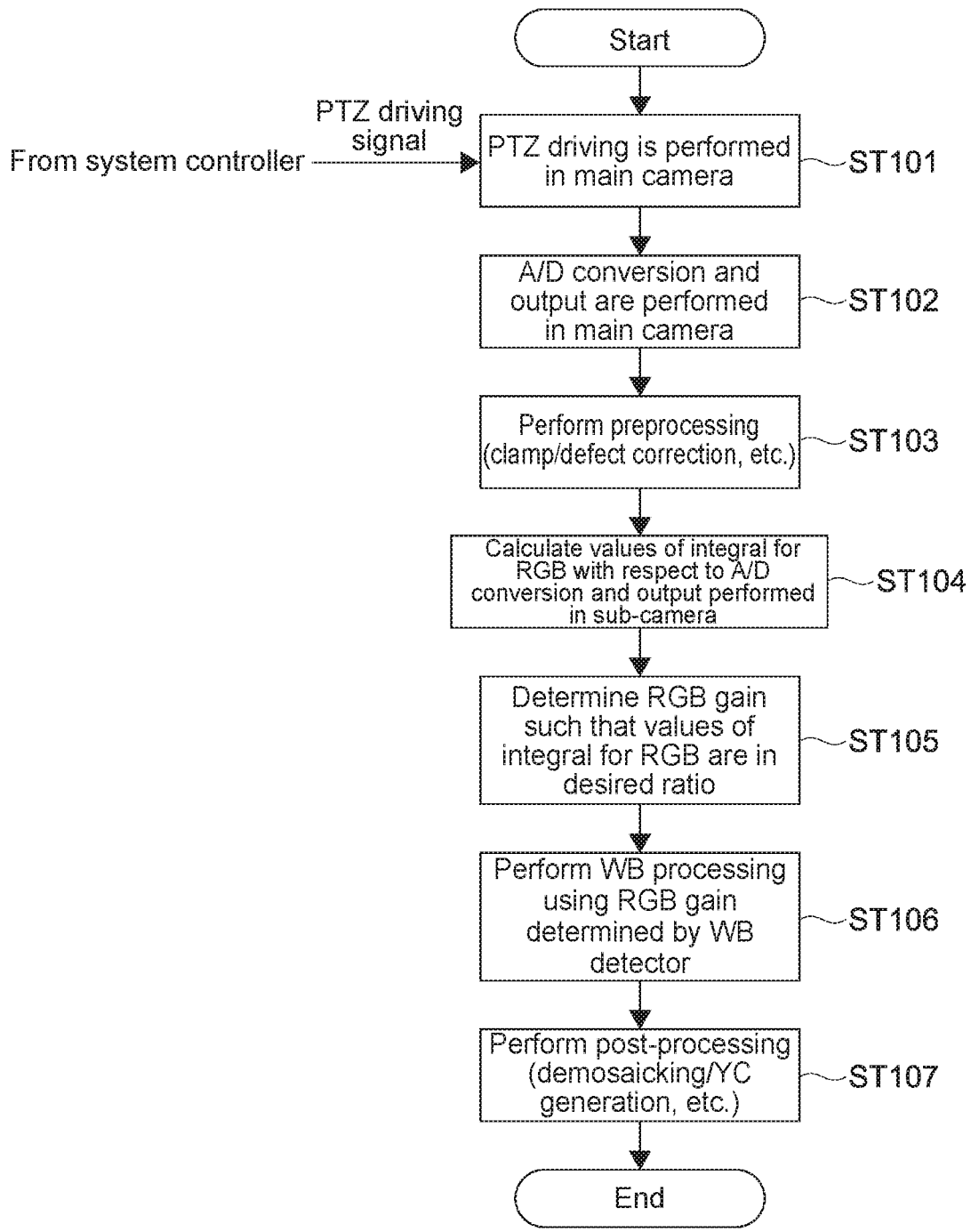
FIG. 6 is a flowchart of an example of an image-shooting operation (on the side of a main camera module).

The sub-camera module 40 includes a sub-camera 41, a maintaining portion 42 that maintains the sub-camera 41, a shaft 43 that is coupled to the maintaining portion 42, and a drive section 44 that drives and rotates the shaft 43 (refer to FIG. 6).

As illustrated in, for example, FIG. 1, the shaft 43 of the sub-camera module 40 is inserted into the center portion of the support base 14 to be rotatably supported. The shaft 43 is inserted into the support base 14 along the rotational axis R of the main camera 21 to be supported rotatably about the rotational axis R. The maintaining portion 42 is provided to extend diagonally above from the shaft 43, and the sub-camera 41 is provided on a tip of the maintaining portion 42.

The maintaining portion 42 and the sub-camera 41 rotate integrally with the shaft 43 when the shaft 43 is rotated by the drive section 44. Since the shaft 43 rotates about the rotational axis R of the main camera 21, the sub-camera 41 can also rotate about the rotational axis R of the main camera 21. Note that a specific configuration of the drive section 44 is not limited, and the drive section 44 may be discretionally configured.

The sub-camera 41 is provided on the maintaining portion 42 such that the image-shooting direction is oriented toward the white plate 30. As illustrated in FIG. 4, an image-shooting region S of the sub-camera 41 is a partial region of the white plate 30 that is situated in a direction from the rotational axis R to the sub-camera 41 (in a direction in which the maintaining portion 42 extends, as viewed from above).

Specifically, the image-shooting region S is a substantially circular region having a diameter that is substantially equal to the width of the white plate 30, the substantially circular region being centered on an approximately middle point between an end on the side of the support base 14 and an end on the opposite side (the side of the peripheral portion of the upper face 11b) of the white plate 30, the approximately middle point existing in the direction from the rotational axis R to the sub-camera 41. In the present embodiment, the image-shooting region S corresponds to a detection region D that is a detection target and is set with respect to an object for calibration.

When the sub-camera 41 is rotated by the drive section 44 about the rotational axis R, the position of the detection region D is changed. Specifically, the detection region D also rotates about the rotational axis R on the white plate 30 according to the rotation of the sub-camera 41. As described above, the present embodiment makes it possible to variably set the detection region D.

In the present embodiment, the sub-camera module 40 corresponds to a sensor section that detects a state of an object for calibration that is irradiated with external light. Further, the sub-camera 41 corresponds to a sensor that can rotate about a specified axis and a camera for detection that performs image-shooting on the object for calibration.

As illustrated in FIGS. 2 and 3, the lighting window 15 is formed of translucent transparent member in a region, in the top cover 13, that is situated from a lower portion provided on the base portion 11 to a position situated midway to a top of the domical shape. The lighting window 15 is zonally formed in all of the 360-degree range surrounding the rotational axis R. Note that the type of the transparent member is not limited, and any material such as plastic or glass may be used.

The thickness of the lighting window 15 (the width of the zonal portion), that is, the size of a region from the lower portion toward the top of the top cover 13 is not limited, and, for example, it is possible to design the lighting window 15 according to a positional relationship between the first and second outdoor lights 4a and 4b illustrated in FIG. 1.

For example, as illustrated in FIGS. 2 to 4, the lighting window 15 is designed to makes it possible to place restrictions on the first illumination light 6a emitted from the first outdoor light 4a entering a region situated on a side opposite to the side of the first outdoor light 4a on the white plate 30, that is, a region situated on the side of the second outdoor light 4b on the white plate 30.

Further, the lighting window 15 is designed to makes it possible to place restrictions on the second illumination light 6b emitted from the second outdoor light 4b entering a region situated on a side opposite to the side of the second outdoor light 4b on the white plate 30, that is, a region on the side of the first outdoor light 4a on the white plate 30. It can also be said that the lighting window 15 is designed to prevent illumination light entering from a specified direction from entering a region situated on a side opposite to the side of the specified direction.

Furthermore, it can also be said that the lighting window 15 is designed such that light entering from a specified direction enters a region situated on a side, on the white plate 30, that the light enters. Of course, the lighting window 15 is not limited to being designed on the basis of such a point of view, and the lighting window 15 may be discretionally designed.

In the present embodiment, the lighting window 15 corresponds to a light entrance that at least a portion of external light enters. Further, as described above, the white plate 30 corresponds to an object for calibration, and is irradiated with external light entering the light entrance. In the present embodiment, a lighting section is provided by the lighting window 15 and the white plate 30 provided on the upper face 11b of the base portion 11.

A region situated from an upper end of the lighting window 15 to a top of the top cover 13 is a light blocking region, and, for example, a structure for providing the mounting portion 50 or any structure for increasing the strength of the top cover 13 is provided. Of course, the configuration is not limited to this.

The mounting portion 50 is coupled to the top of the top cover 13. In the present embodiment, the mounting portion 50 is provided to extend along the rotational axis R of the main camera 21. A fitting or the like (not illustrated) is provided on a tip of the mounting portion 50, and this makes it possible to provide the mounting portion 50 on the tip of the prop 2 illustrated in FIG. 1. The configuration of the mounting portion 50 is not limited, and the mounting portion 50 may be discretionally designed.

Figure 5:
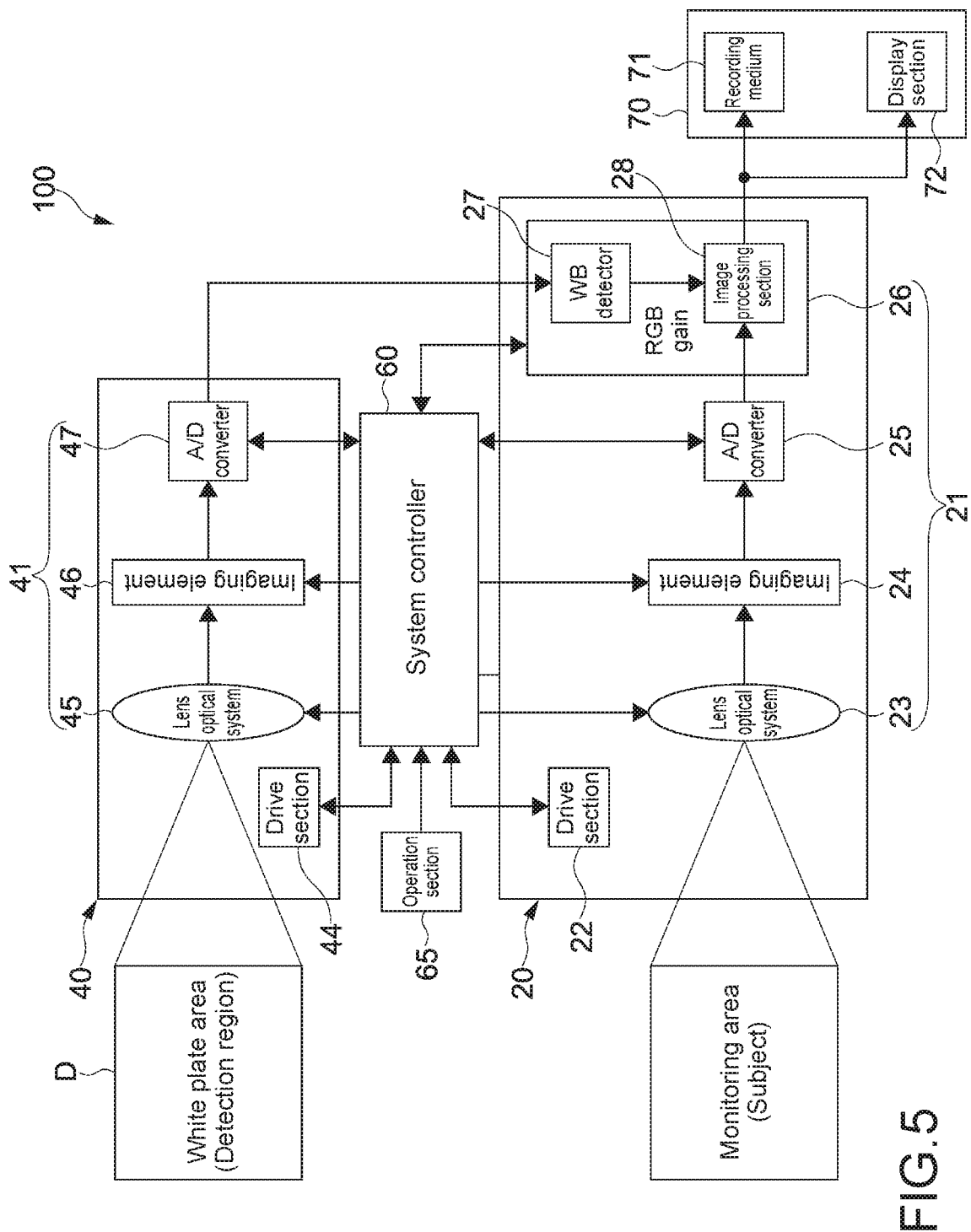
FIG. 5 is a block diagram of an example of a functional configuration of the monitoring camera.

FIG. 5 is a block diagram of an example of a functional configuration of the monitoring camera 100. The monitoring camera 100 includes a system controller 60 and an operation section 65 in addition to the main camera module 20 and the sub-camera module 40.

The main camera 21 of the main camera module 20 includes a lens optical system 23, an imaging element 24, an A/D converter 25, and an image generator 26. The lens optical system 23 forms, in the imaging element 24, an image of a subject in a monitoring area. A specific configuration of the lens optical system 23 is not limited, and the lens optical system 23 may be discretionally designed.

The imaging element 24 generates an image signal depending on the image of a subject. The image signal includes pixel signals of respective pixels making up an image, and signals for respective colors of red, green, and blue are generated in each pixel. For example, a charge coupled device (CCD) sensor or a complementary metal-oxide semiconductor (CMOS) sensor is used as the imaging element 24. Of course, any other type of image sensor or the like may be used.

The A/D converter 25 converts the image signal generated by the imaging element 24 into a digital signal. A specific configuration of the A/D converter 25 is not limited, and any conversion circuit or the like may be used.

The image generator 26 includes a white balance (WB) detector 27 and an image processing section 28. The WB detector 27 generates an RGB gain used to perform a WB adjustment. The image processing section 28 applies the RGB gain generated by the WB detector 27 to the digital image signal output by the A/D converter 25, so as to adjust a white balance.

The configuration of the image generator 26 is not limited, and the image generator 26 may be provided by any hardware such as an integrated circuit (IC) and any software provided by, for example, a CPU.

The image signal in which a white balance has been adjusted is transmitted to a monitoring and control system 70 through any communication path such as a network. Then, the image signal is recorded in a recording medium 71 of the monitoring and control system 70, or is displayed on a display section 71 of the monitoring and control system 70. For example, the monitoring and control system 70 is provided in, for example, a monitoring and control room managed by, for example, a company that provides monitoring services.

In the monitoring camera 100 illustrated in FIG. 5, an illustration of a communication section for transmitting an image signal is omitted. For example, a wireless LAN module such as Wi-Fi or a communication module for near field radio communication such as Bluetooth (registered trademark) is used as the communication section.

The sub-camera 41 of the sub-camera module 40 includes a lens optical system 45, an imaging element 46, and an A/D converter 47. The lens optical system 45 forms an image of a detection region D in the imaging element 46. A specific configuration of the lens optical system 45 is not limited. Note that, as illustrated in FIG. 5, the detection region D may also be referred to as a white plate area.

The imaging element 46 generates an image signal depending on the image of the detection region D. The image signal includes pixel signals of respective pixels making up an image, and signals for respective colors of red, green, and blue are generated in each pixel. For example, any image sensor such as a CCD sensor is used as the imaging element 46.

The A/D converter 47 converts the image signal generated by the imaging element 46 into a digital signal. A specific configuration of the A/D converter 47 is not limited, and any conversion circuit or the like may be used. The digital image signal generated by the A/D converter 47 is output to the WB detector 27 of the main camera module 20.

The operation section 65 is a block operated by a user, and is provided with any operation device such as a power switch or a light adjusting lever.

The system controller 60 can control operations of respective mechanisms, such as the main camera module 20 and the sub-camera module 40, that are included in the monitoring camera 100. For example, the system controller 60 can control the operations of the respective camera modules according to various operation signals that are input through the operation section.

The system controller 60 includes, for example, a CPU, a RAM, and a ROM, and controls the respective mechanisms by the CPU loading, into the RAM, a program for performing control prerecorded in the ROM and executing the loaded program.

The configuration of the system controller 60 is not limited, and any hardware and any software may be used. For example, a programmable logic device (PLD) such as a field programmable gate array (FPGA), or any other device such as an application specific integrated circuit (ASIC) may be used. The system controller 60 is configured, for example, inside the base portion 11.

It can also be said that the system controller 60 that controls the sub-camera module 40 serves as a portion of the sensor section in the present embodiment.

Further, in the present embodiment, an image-shooting controller that controls the main camera 21 according to a result of a detection performed by the sub-camera module 40, is provided by the system controller 60 and the image generator 26. In other words, in the present embodiment, the image generator 26 included in the main camera module 20 serves as a portion of the camera (the main camera 21), and also serves as the image-shooting controller. Of course, the configuration is not limited to this, and the camera and the image-shooting controller may be individually configured independently of each other.

[Image-Shooting Operation (WB Adjustment)]

Figure 7:
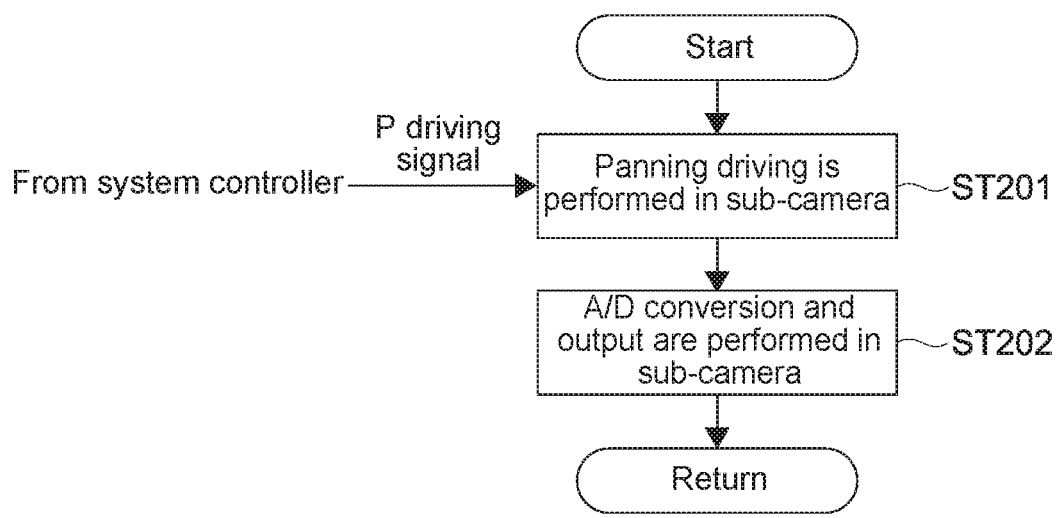
FIG. 7 is a flowchart of an example of an image-shooting operation (on the side of a sub-camera module).

FIGS. 6 and 7 are flowcharts of an example of an image-shooting operation of the monitoring camera 100. FIG. 6 is a flowchart of an example of an operation of the main camera module 20. FIG. 7 is a flowchart of an example of an operation of the sub-camera module 40.

In the main camera module 20, first, the image-shooting direction of the main camera 21 is controlled by the drive section 22 using a PTZ driving signal generated by the system controller 60, as illustrated in FIG. 6 (Step 101). In other words, panning, a tilt, and a zoom of the main camera 21 are determined using the PTZ driving signal.

An image signal of an image-shooting range is generated and output to the image generator 26 by the imaging element 24 and the A/D converter 25 of the main camera 21 (Step 102). Preprocessing, such as a clamp process and a defect correction process, is performed by a preprocessing section (an illustration thereof is omitted) of the image generator 26 (Step 103). A specific algorithm or the like of the preprocessing is not limited.

Values of integral for red, green, and blue are respectively calculated by the WB detector 27 of the image generator 26 with respect to an image signal of a detection region D, the image signal of the detection region D being output by the imaging element 46 and the A/D converter 47 (Step 104). An RGB gain is calculated such that the calculated respective values of integral for red, green, and blue are in a desired ratio (Step 105).

Here, a correction process depending on a difference between an imaging property of the imaging element 24 of the main camera 21 and an imaging property of the imaging element 46 of the sub-camera 41, may be performed. For example, it is possible to compare a color reproducibility of the imaging element 24 and a color reproducibility of the imaging element 46 that are exhibited when the white plate 30 is irradiated with an identical piece of light, and to preset, for example, a correction filter, for example, upon shipment from the factory. This makes it possible to accurately adjust a white balance with respect to the image signal generated by the imaging element 24 of the main camera 21.

A white balance is adjusted by the image processing section 28 using the RGB gain generated by the WB detector 27 (Step 106). In other words, the RGB gain generated in Step 105 is applied to the image signal generated in Step 103 by preprocessing being performed, so as to adjust a white balance.

Post-processing, such as a demosaicking process and a YC generation process, is performed by a post-processing section (an illustration thereof is omitted) of the image generator 26 with respect to the image signal in which a white balance has been adjusted (Step 107). The image signal on which post-processing has been performed is transmitted to the monitoring and control system 70 through any communication path such as a network.

As described above, in the present embodiment, a white balance of an image shot using the main camera 21 is controlled according to an image signal generated by the sub-camera 41.

As illustrated in FIG. 7, in the sub-camera module 40, the rotational position of the sub-camera 41 is controlled by the drive section 44 according to a P driving signal generated by the system controller 60. In the present embodiment, the rotational position of the sub-camera 41 is controlled such that the rotational position of the sub-camera 41 with respect to the rotational axis R coincides with the rotational position of the main camera 21. In other words, the rotational position of the sub-camera 41 is controlled such that the orientation of the sub-camera 41 substantially coincides with the orientation of the main camera 21.

Specifically, referring to FIG. 4, the rotational position is controlled such that the direction from the rotational axis R to the sub-camera 41 (a direction in which the maintaining portion 42 extends, as viewed from above) substantially coincides with the image-shooting direction of the main camera 21, as viewed from above. In other words, in the example illustrated in FIG. 4, the main camera 21 is controlled to be oriented toward the left, and thus, the image-shooting direction is left.

Note that the rotational position with respect to the rotational axis R is a position represented by a rotation angle when a specified position with respect to the rotational axis R is used as a reference position (0°). Thus, the fact that the rotational position of the sub-camera 41 substantially coincides with the rotational position of the main camera 21 means that the rotation angle of the sub-camera 41 from the reference (0°) is substantially equal to the rotation angle of the main camera 21 from the reference position (0°).

Note that, focused on the respective orientations of the main camera 21 and the sub-camera 41, it can also be said that the direction angle of the main camera 21 from the reference position with respect to the rotational axis R and the direction angle of the sub-camera 41 from the reference position with respect to the rotational axis R are substantially equal to each other.

Note that, in the present embodiment, the orientation of the main camera 21 corresponds to a direction in which an image-shooting direction extends, and the orientation of the sub-camera 41 corresponds to a direction from the rotational axis R to the sub-camera 41. Thus, in the present embodiment, it can also be said that the image-shooting direction of the main camera 21 substantially coincides with the direction from the rotational axis R to the sub-camera 41.

Further, a direction in which an image-shooting optical axis extends, as viewed from above, can also be considered an orientation (an image-shooting direction) of the sub-camera 41, the image-shooting optical axis extending diagonally from the sub-camera 41 to the white plate 30, as illustrated in FIG. 2 (in the present embodiment, it coincides with the direction from the rotational axis R to the sub-camera 41). Thus, it can also be said that the rotational position of the sub-camera 41 is controlled such that the image-shooting direction of the main camera 21 and the image-shooting direction of the sub-camera 41 substantially coincide with each other, as viewed from above.

As described above, control is performed such that the rotational position of the main camera 21 and the rotational position of the sub-camera 41 substantially coincide with each other. This results in the rotational position of a detection region D with respect to the rotational axis R also substantially coinciding with the rotational position of the main camera 21. In other words, a region of the white plate 30 that is situated on a side toward which the main camera 21 is oriented, is set to be a detection region D.

Thus, in the present embodiment, a region of the white plate 30 depending on the rotational position of the main camera 21 with respect to the rotational axis R can be set to be a detection region D. This results in being able to variably set a detection region D according to the change in an image-shooting direction of the main camera 21.

Focused on this point, it can also be said that the rotational position of the sub-camera 41 is controlled such that the rotational position of a detection region D with respect to the rotational axis R substantially coincides with the rotational position of the main camera 21 with respect to the rotational axis R. Of course, a term such as a rotation angle or a direction angle can also be used instead of the rotational position.

Note that, in Step 201, the use of a P driving signal used to perform panning driving with respect to the main camera 21, makes it possible to easily control the rotational position of the sub-camera 41 to substantially coincide with the rotational position of the main camera 21.

An image signal of a detection region D is generated and output to the WB detector 27 of the image generator 26 by the imaging element 46 and the A/D converter 47 of the sub-camera 41 (Step 202). The process of calculating values of integral in Step 104 of FIG. 6 is performed with respect to the output image signal.

A method for coordinating the operation of the main camera module 20 illustrated in FIG. 6 and the operation of the sub-camera module 40 illustrated in FIG. 7 is not limited. For example, the processes illustrated in FIG. 7 may be performed every time a PTZ driving signal is generated by the system controller 60, and an RGB gain used to adjust a white balance may be updated.

Alternatively, independently of the image-shooting operation of the main camera module 20 illustrated in FIG. 6, the processes illustrated in FIG. 7 may be constantly performed at regular intervals to update an RGB gain used to adjust a white balance. Moreover, any timing control or synchronization control may be performed in order to coordinate the operation of the main camera module 20 and the operation of the sub-camera module 40.

As described above, in the monitoring camera 100 according to the present embodiment, at least a portion of the first illumination light 6a and the second illumination light 6b (or the sunlight 8) that are external light are irradiated onto the white plate 30 through the lighting window 15. A state of the white plate 30 irradiated with the external light is detected, and the main camera 21 is controlled according to a result of the detection. This makes it possible to consecutively perform image-shooting on a subject with a high degree of accuracy.

When image-shooting is performed using the monitoring camera 100, it is important that a color of a shot video (shot image) be close to the actual color, in order to identify a target. For example, when the clothes of a monitoring-target person, or a monitoring-target vehicle is in a color different from the actual color in a shot image, there is a reduction in the accuracy in identifying the monitoring target, and thus, for example, the monitoring target may escape detection.

Here, it is assumed that, for example, processing of a general automatic white balance is performed with respect to a shot video. In the case of the general automatic white balance, an RGB gain is determined such that a balance of an average of respective values for red, green, and blue (integrated values) in an entire image results in a specified color such as grey. Thus, when the color of a subject on which image-shooting is performed is not balanced, it is often the case that, conversely, it is not even close to the correct color.

For example, when processing of an automatic white balance is performed on an image in which a red subject shows up in a large size, an image is generated that is more bluish than the actual color. Further, when processing of an automatic white balance is performed on an image in which a blue subject shows up in a large size, an image is generated that is more reddish than the actual color. As described above, there is a possibility of generating an image in which a subject shows up in a color different from the actual color.

In the present embodiment, the lighting window 15 is provided to the upper portion of the casing 10. This makes it possible to let in, through the lighting window 15, light emitted from the light source 5 (the first and second light sources 5a and 5b, and the sun 7) situated above the monitoring camera 100. In other words, it is possible to let in, through the lighting window 15, illumination light (the first illumination light 6a, the second illumination light 6b, and the sunlight 8) that illuminates an image-shooting range.

Then, an RGB gain is determined using an image signal of a shot image of the white plate 30, the shot image of the white plate 30 being shot using the sub-camera 41, the white plate 30 being irradiated with the let-in illumination light (the first illumination light 6a, the second illumination light 6b, and the sunlight 8), so as to adjust a white balance.

This makes it possible to perform image-shooting on a subject with a high degree of accuracy to obtain an image of the subject in a color very close to the actual color, the subject being illuminated with illumination light (the first illumination light 6a, the second illumination light 6b, and the sunlight 8). In other words, it is possible to generate a highly accurate monitoring image depending on color shade of the light source 5 (the first and second light sources 5a and 5b, and the sun 7), regardless of color shade of a subject.

Further, in Patent Literature 1 described above, a white plate is moved up to a light path of image-shooting performed using a camera when a white balance is adjusted. In this case, it is not possible to perform image-shooting on a subject when a white balance is adjusted, and thus a monitoring video is interrupted midway.

In the present embodiment, the use of the lighting window 15 provided to the upper portion of the casing 10, the white plate 30, and the sub-camera module 40 makes it possible to constantly acquire an image signal used to adjust a white balance without interrupting image-shooting performed using the main camera 21. This makes it possible to consecutively perform image-shooting on a subject, and to build a highly accurate monitoring system.

Further, in the present embodiment, the rotational position of the sub-camera 41 is controlled according to the orientation of the main camera 21, as illustrated in, for example, FIG. 4. Then, a region, on the white plate 30, toward which the main camera 21 is oriented is set to be a detection region D. This makes it possible to calculate an RGB gain according to illumination light illuminating an image-capturing range toward which the main camera 21 is oriented. In other words, it is possible to control a white balance according to a property of illumination light illuminating an image-capturing range, and to consecutively perform image-shooting on a subject with a high degree of accuracy.

For example, it is assumed that a color temperature of the first illumination light 6a emitted from the first light source 5a illustrated in FIG. 1 and a color temperature of the second illumination light 6b emitted from the second light source 5b illustrated in FIG. 1 are different from each other. It is assumed that the main camera 21 is oriented toward a side of the first outdoor light 4a and image-shooting is performed on a region around the first outdoor light 4a. The region around the first outdoor light 4a is a range primarily illuminated with the first illumination light 6a.

In the present embodiment, the detection region D is changed according to the orientation of the main camera 21. In other words, as illustrated in FIG. 4, a region, on the white plate 30, that is irradiated with the first illumination light 6a is set to be the detection region D. This makes it possible to calculate an RGB gain depending on the color temperature of the first illumination light 6a, and to adjust a white balance according to the color temperature of the first illumination light 6a. This results in being able to perform image-shooting on the region around the first outdoor light 4a with color shade close to the actual color, regardless of what subject is included in the region.

The same applies to the case in which the main camera 21 is oriented toward a side of the second outdoor light 4b. A region, on the white plate 30, that is irradiated with the second illumination light 6b is set to be the detection region D. This makes it possible to adjust a white balance according to the color temperature of the second illumination light 6b. This results in being able to perform image-shooting on a region around the second outdoor light 4b with color shade close to the actual color.

The same applies to image-shooting performed when the first and second outdoor lights 4a and 4b are turned off in the daytime. It is possible to calculate an RGB gain depending on a color temperature of the sunlight 8 emitted from the sun 7 by letting in the sunlight 8, the color temperature varying depending on, for example, weather. This makes it possible to adjust a white balance with a high degree of accuracy, and to consecutively perform image-shooting on a subject with a high degree of accuracy. Further, it is possible to adjust a white balance according to the sunlight 8 illuminating an image-shooting range, by changing a detection region D according to the orientation of the main camera 21.

Regarding the cooperation between the main camera 21 and the sub-camera 41, other methods may also be adopted. For example, a shaft in common that extends on the rotational axis R and can rotate about the rotational axis R is provided. The main camera 21 and the sub-camera 41 are provided to be fixed to this shaft in common such that the rotational positions of the main camera 21 and the sub-camera 41 substantially coincide with each other.

The shaft in common is rotated by the drive section 22 of the main camera module 20 using a PTZ driving signal generated by the system controller 60. This results in the main camera 21 being moved to a specified rotational position in a panning direction. Following this movement, the sub-camera 41 is rotated integrally with the main camera 21 while maintaining the state in which their respective rotational positions substantially coincide with each other.

As described above, the main camera 21 and the sub-camera 41 may be provided to a shaft in common in advance such that their respective rotational positions coincide with each other. This makes it possible to easily rotate the sub-camera 41 following panning driving with respect to the main camera 21. This also results in being able to omit the drive section 44 of the sub-camera module 40, and thus to make the apparatus simpler and smaller. Moreover, any configuration and any method for operating the main camera 21 and the sub-camera 41 in conjunction with each other may be adopted.

Second Embodiment

A monitoring camera according to a second embodiment of the present technology is described. In the following descriptions, descriptions of a configuration and an operation that are similar to those of the monitoring camera 100 of the embodiment described above are omitted or simplified.

Figure 8:
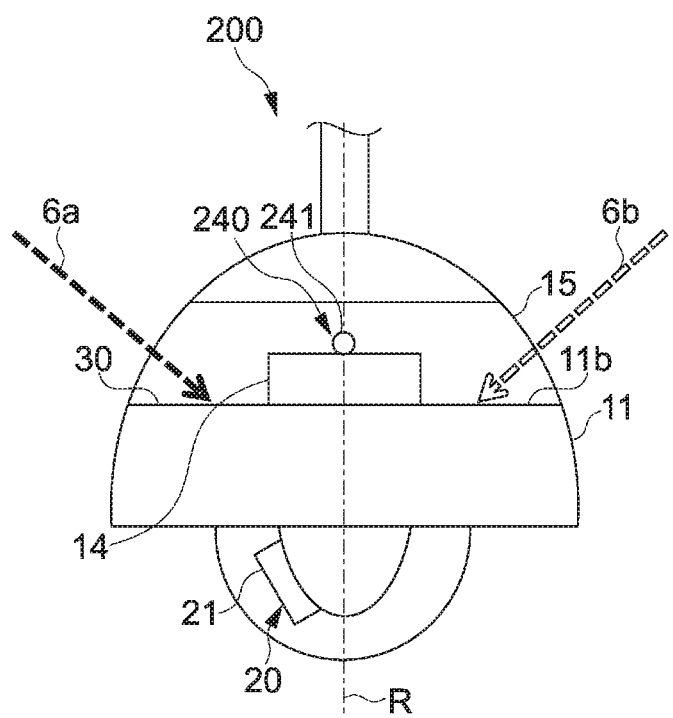
FIG. 8 is a side view illustrating an example of a configuration of a monitoring camera according to a second embodiment.
Figure 9:
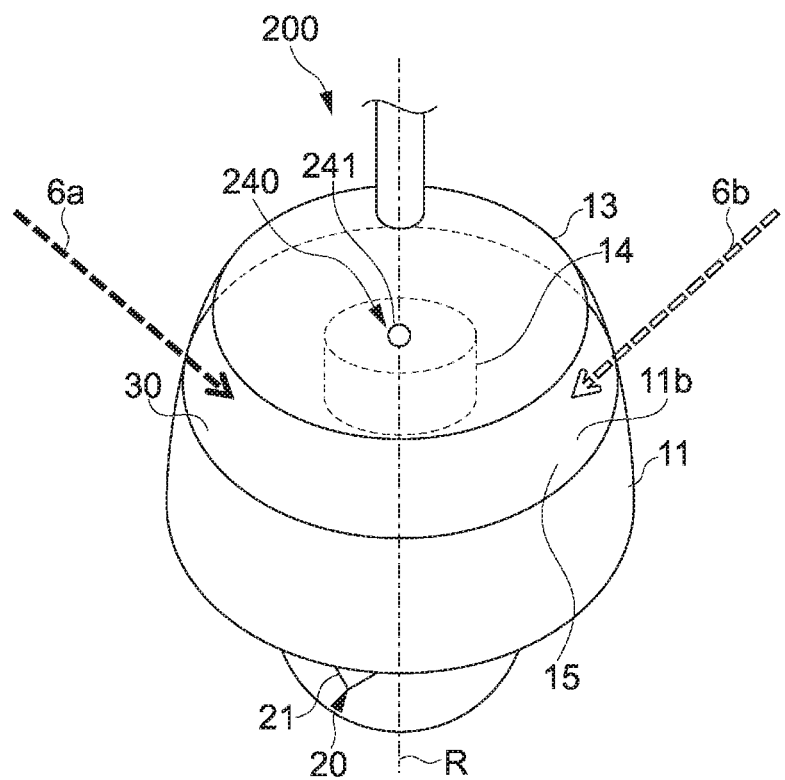
FIG. 9 is a perspective view illustrating the example of the configuration of the monitoring camera.
Figure 10:
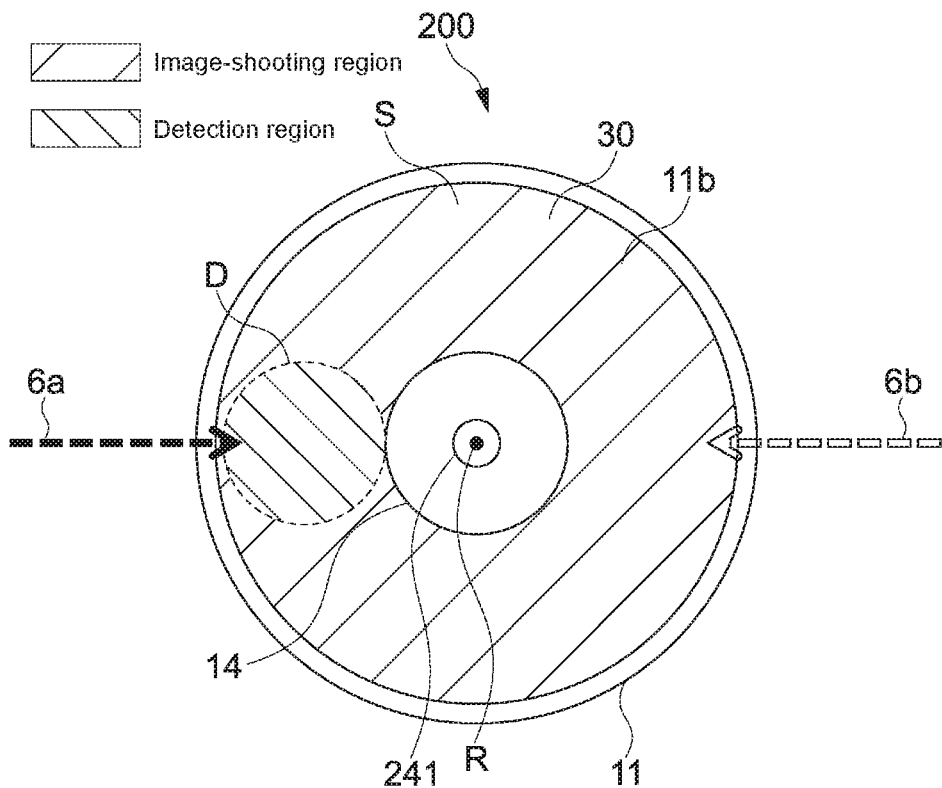
FIG. 10 is a top view illustrating the example of the configuration of the monitoring camera.
Figure 11:
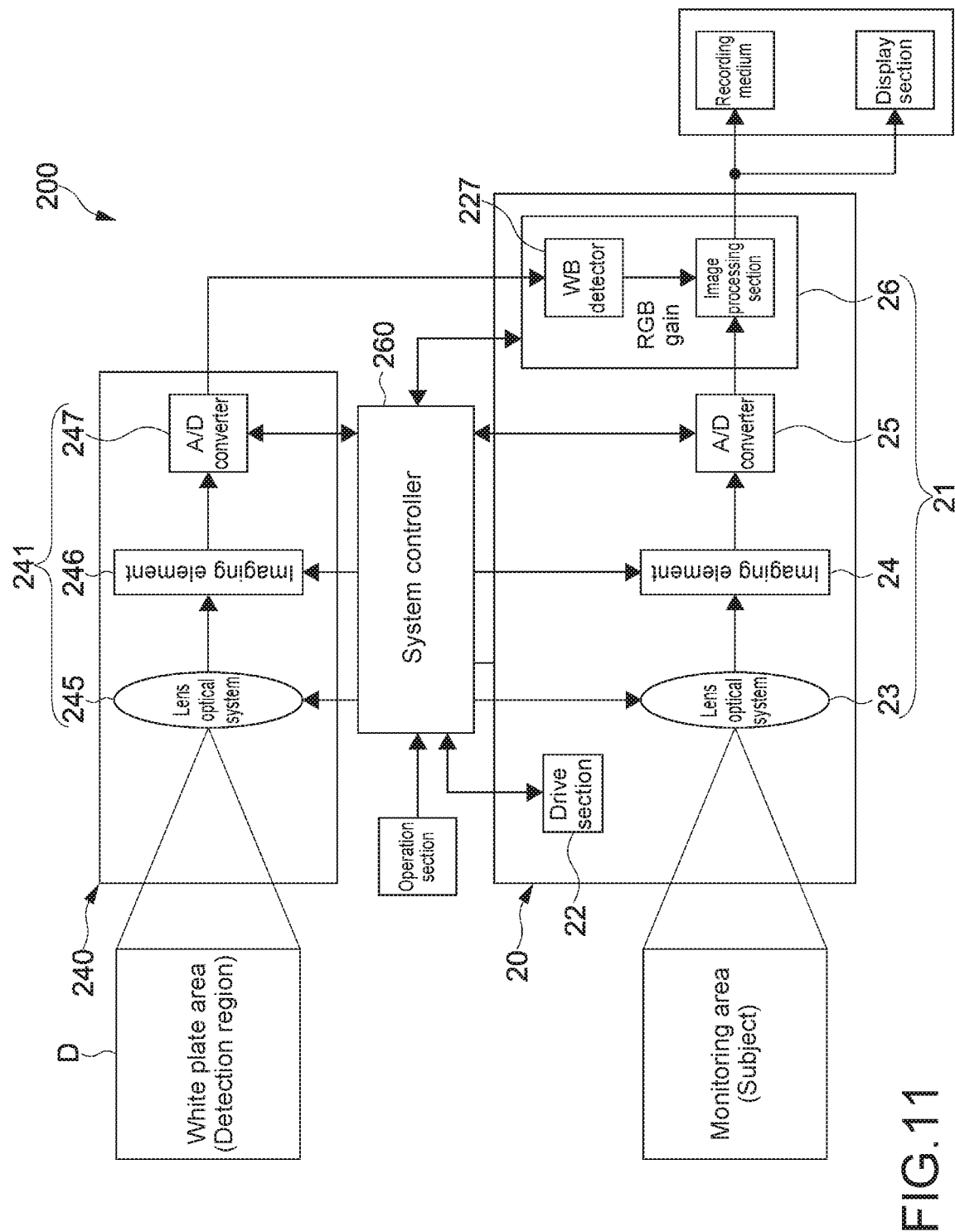
FIG. 11 is a block diagram of an example of a functional configuration of the monitoring camera.

FIGS. 8 to 10 schematically illustrate an example of a configuration of a monitoring camera 200 according to the present embodiment. FIG. 11 is a block diagram of an example of a functional configuration of the monitoring camera 200.

The monitoring camera 200 includes a 360-degree-camera module 240 instead of the sub-camera module 40 according to the first embodiment illustrated in FIGS. 2 to 4. As illustrated in FIGS. 8 to 10, the 360-degree-camera module 240 includes a 360-degree camera 241 that can perform 360-degree all-around image-shooting.

The 360-degree camera 241 is provided on the support base 14 provided on the upper face 11b of the base portion 11. The 360-degree camera 241 is provided on the rotational axis R of the main camera 21, and performs image-shooting in a 360-degree range surrounding the rotational axis R. Thus, as illustrated in FIG. 10, all of the region of the white plate 30 provided on the upper face 11b of the base portion 11 is an image-shooting region S of the 360-degree camera 241.

As illustrated in FIG. 11, the 360-degree camera 241 includes a lens optical system 223, an imaging element 224, and an A/D converter 225. A specific configuration of the 360-degree camera 241 is not limited, and any configuration that makes it possible to perform 360-degree all-around image-shooting may be adopted.

In the present embodiment, the detection region D illustrated in FIG. 10 is set by a system controller 260 that serves as a portion of the sensor section. Substantially as in the case of the first embodiment, the detection region D is set according to the change in the image-shooting direction of the main camera 21. Specifically, a region of the white plate 30 depending on the rotational position of the main camera 21 with respect to the rotational axis R is set to be the detection region D.

In the first embodiment, the detection region D is variably set by controlling the rotational position of the sub-camera 41 to coincide with the rotational position of the main camera 21. In the present embodiment, the detection region D is variably set software-wise by the system controller 260.

For example, it is possible to set the detection region D using a PTZ driving signal generated by the system controller 260. For example, a substantially circular region is set to be the detection region D according to the rotational position of the main camera 21 in a panning direction, the substantially circular region being situated in the image-shooting direction of the main camera 21. Moreover, any algorithm in which a region on the white plate 30 is set to be the detection region D, may be adopted, the region being situated on a side toward which the main camera 21 is oriented.

Figure 12:
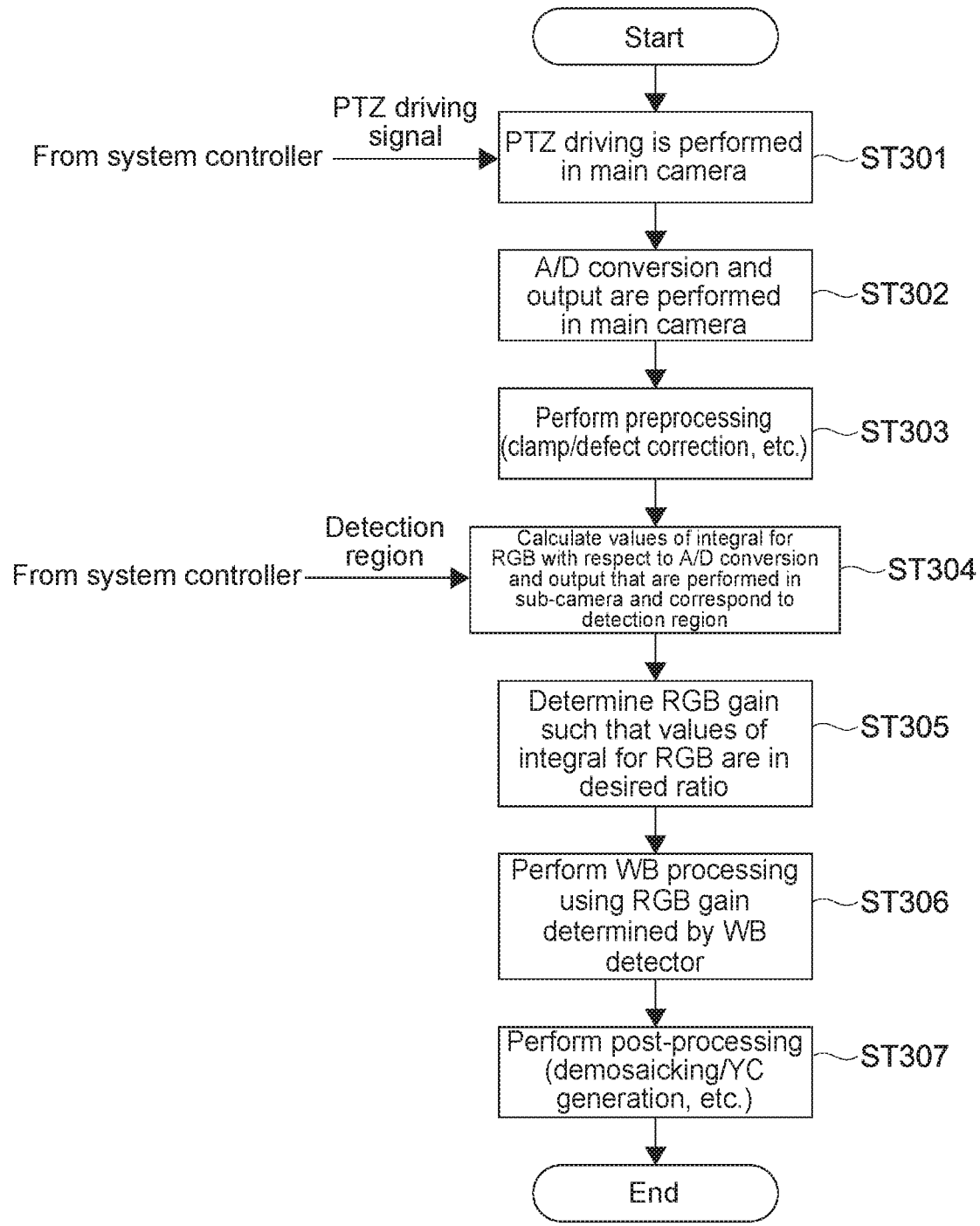
FIG. 12 is a flowchart of an example of an image-shooting operation (on the side of a main camera module).

FIG. 12 is a flowchart of an example of an operation of a main camera module 420. Steps 301 to 303 are substantially similar to Steps 101 to 103 illustrated in FIG. 6.

Using information regarding a detection region D set by the system controller 260, values of integral for red, green, and blue are respectively calculated by a WB detector 227 illustrated in FIG. 11 with respect to an image signal of the detection region D (Step 304).

Specifically, an image signal of the detection region D is extracted from an image signal of all of the region (an image-shooting region S) of the white plate 30, the image signal of all of the region of the white plate 30 being output by the 360-degree camera 241. In other words, a pixel signal of a pixel included in the detection region D set by the system controller 260 is extracted. The values of integral for red, green, and blue are respectively calculated with respect to the extracted image signal of the detection region D.

An RGB gain is calculated such that the respective values of integral for red, green, and blue that are calculated by the WB detector 227 in Step 304 are in a desired ratio (Step 305). After that, a white balance is adjusted using the calculated RGB gain, and post-processing is performed (Steps 306 and 307), substantially as in Steps 106 and 107 illustrated in FIG. 6.

It is also possible to provide the effect described in the first embodiment when the detection region D is set by the system controller 260, as described in the present embodiment. Note that the WB detector 227 may include a function that sets the detection region D. In this case, the detection region D is set by the WB detector 227 using a PTZ driving signal output by the system controller 260. Alternatively, a functional block that sets the detection region D may be individually configured.

Third Embodiment

Figure 13:
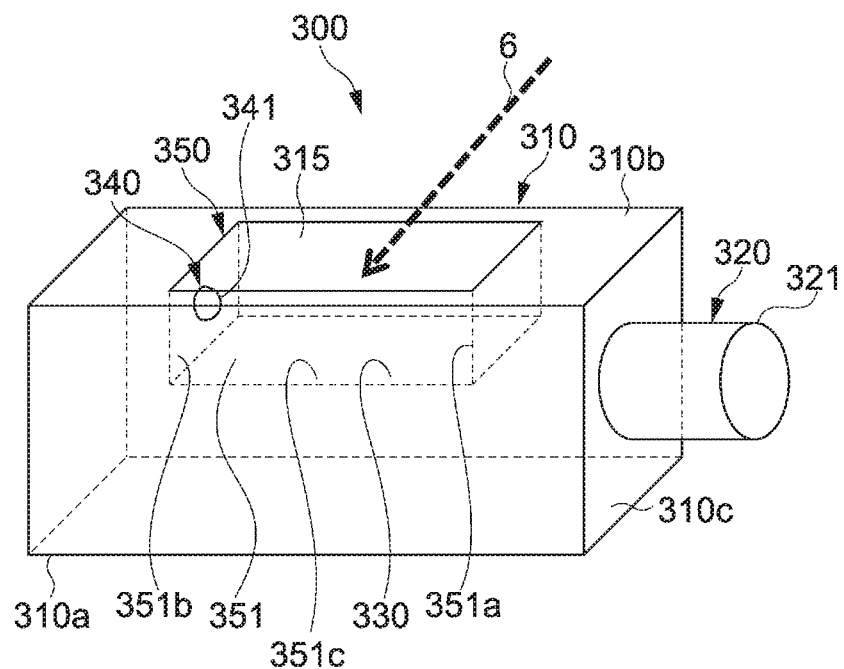
FIG. 13 is a perspective view illustrating an example of a configuration of a monitoring camera according to a third embodiment.
Figure 14:
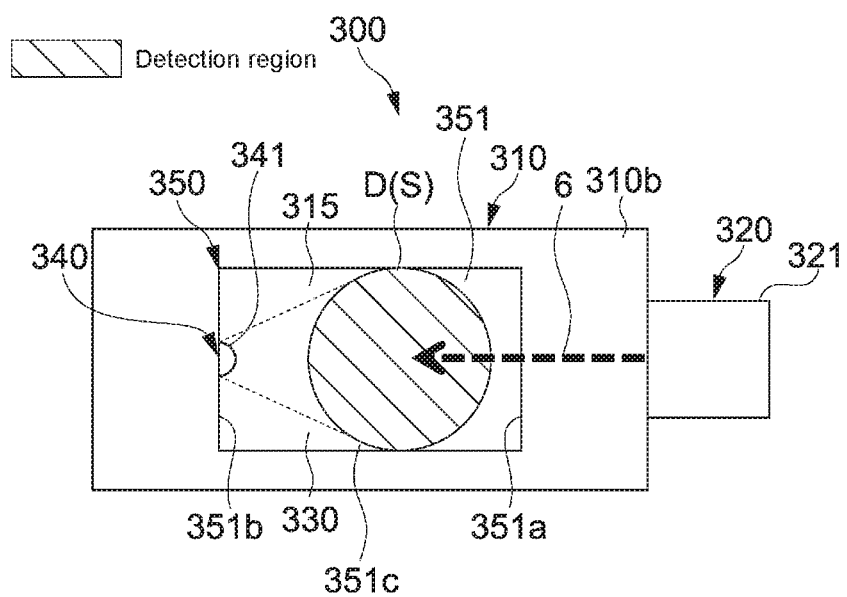
FIG. 14 is a top view illustrating the example of the configuration of the monitoring camera.

FIGS. 13 and 14 schematically illustrate an example of a configuration of a monitoring camera according to a third embodiment of the present technology. FIG. 13 is a perspective view of a monitoring camera 300, as viewed from diagonally above, where a sub-camera module 340 from among portions that are not visually confirmed is indicated by a solid line, and the other portions from among the not visually confirmed portions are indicated by a wavy line. FIG. 14 is a top view of the monitoring camera 300, as viewed from above.

The monitoring camera 300 includes a casing 310, a main camera module 320, a lighting section 350, and the sub-camera module 340.

The casing 310 has an approximate rectangular-parallelepiped shape, and includes a lower face 310a included in a lower portion, an upper face 310b included in an upper portion, and four lateral faces 310c included in a lateral portion.

The main camera module 320 includes a main camera 321 provided on one of the four lateral faces 310c. In other words, in the present embodiment, the main camera 321 is provided to the lateral portion of the casing 310. In the following descriptions, it is assumed that a side on which the main camera is provided is a front side, and the opposite side is a rear side.

The lighting section 350 includes a lighting window 315, a concave portion 351, and a white plate 330. The lighting window 315 is provided in an approximate center portion of the upper face 310b of the casing 310. The lighting window 315 has a rectangular shape, and is provided in parallel with a front-rear direction of the casing 310.

The concave portion 351 is provided inside the casing 310 from the lighting window 315. Thus, the lighting window 315 is a face that covers the concave portion 351. The concave portion 351 has an approximate rectangular-parallelepiped shape, and includes a front face 351a, a rear face 351b, and a bottom face 351c. The front face 351a and the rear face 351b are faces that face each other in the front-rear direction of the casing 310. The bottom face 351c is a face that faces the lighting window 315.

The white plate 330 is provided on almost all over the bottom face 351c of the concave portion 351.

The sub-camera module 340 includes a sub-camera 341 that is provided on the rear face 351b of the concave portion 351. As illustrated in FIG. 14, the sub-camera 341 is provided such that the sub-camera 341 can perform image-shooting on the white plate 330 from the rear face 351b toward the front side. The image-shooting region S of the sub-camera 341 is the detection region D.

As illustrated in FIGS. 13 and 14, it is possible to let in, from the lighting section 350, illumination light 6 emitted from a light source. Thus, it is possible to calculate an RGB gain depending on a color temperature of the illumination light 6, and to adjust a white balance according to the color temperature of the illumination light 6. This results in being able to consecutively perform image-shooting on a subject with a high degree of accuracy, as in the case of the embodiments described above.

Further, since the sub-camera 341 is provided on the rear face 351b of the concave portion 351, the image-shooting direction of the main camera 321 and the image-shooting direction of the sub-camera 341 substantially coincide with each other, as viewed from above. Thus, for example, even when the entire monitoring camera 300 is moved, it is possible to maintain a state in which the image-shooting direction of the main camera 321 and the image-shooting direction of the sub-camera 341 substantially coincide with each other. This results in being able to efficiently let in the illumination light 6 illuminating an image-shooting range toward which the main camera 321 is oriented, and to adjust a white balance with a high degree of accuracy.

For example, it is assumed that the monitoring camera 300 according to the present embodiment is provided to the prop 2 illustrated in FIG. 1. It is assumed that the entire monitoring camera 300 is oriented toward the side of the first outdoor light 4a and tilted downward. In this case, the entire monitoring camera 300 is tilted such that the lighting window 315 of the lighting section 350 faces the first light source 5a of the first outdoor light 4a. This makes it possible to efficiently let in the first illumination light 6a illuminating near the first outdoor light 4a, and to generate a highly accurate monitoring image. The same applies to the case in which the monitoring camera 300 is oriented toward the side of the second outdoor light 4b.

Of course, the monitoring camera 300 may be used in a fixed state without being moved. Also in this case, it is possible to adjust a white balance with a high degree of accuracy according to the illumination light 6 emitted from a light source.

Other Embodiments

The present technology is not limited to the embodiments described above, and may achieve other various embodiments.

As a control of a main camera that is performed according to a result of detecting a state of a white plate irradiated with illumination light, a control of a white balance has been described above. What is controlled is not limited to this, and a control of an ISO speed of an image shot using the main camera, may be performed as the control of the main camera.

For example, when the ISO speed is adjusted using an image shot using a main camera, the accuracy in adjusting the ISO speed may be reduced due to the brightness (color shade) of a subject.

For example, even when a light source (the sun) is dark in cloudy weather upon performing image-shooting in the daytime, there is a possibility that image-shooting on a subject will not be performed with an appropriate brightness, since the ISO speed is suppressed due to the subject being in a light color or having a high optical reflectance and the subject showing up in a large size in an image. Further, also when the weather is fine and a light source (the sun) is bright, there is a possibility that image-shooting on a subject will not be performed with an appropriate brightness, since the ISO speed is set relatively high due to the subject being in a dark color and showing up in a large size in an image.

As described in the first to third embodiments using the examples, the present technology makes it possible to let in illumination light emitted from a light source. Thus, it is possible to accurately control the ISO speed according to the brightness of the light source regardless of color shade of a subject. This results in being able to generate a highly accurate monitoring image. Of course, a similar effect is also provided when the light source is not the sun but an outdoor light.

Moreover, a control other than the control of a white balance and the control of an ISO speed may be performed as a control of a main camera that is performed according to a result of sensing a white plate irradiated with illumination light.

In the descriptions above, the sub-camera module and the 360-degree camera module that make it possible to perform image-shooting on a white plate irradiated with illumination light are used as the sensor section that detects a state of the white plate. The sensor section is not limited to them, and any brightness sensor (photometric sensor), any chromaticity sensor, or any array sensor including a plurality of sensors may be used.

Further, any parameter such as the brightness (the intensity), the chromaticity, and the light-beam form of light reflected off a white plate irradiated with illumination light, may be used as a state of the white plate. A thermal sensor may be arranged as the sensor section, and heat of the white plate irradiated with illumination light may be detected.

In the descriptions above, the white plate is used as an example of the object for calibration. The object for calibration is not limited to this, and any object may be used as the object for calibration. For example, any white object or any object of a color close to white can be used. Alternatively, an object of a specified color or an object having a specified optical reflectance may be used as the object for calibration. Further, the shape of the object for calibration is also not limited, and not only a tapered shape illustrated in FIG. 15, but also any shape may be adopted.

Figure 15:
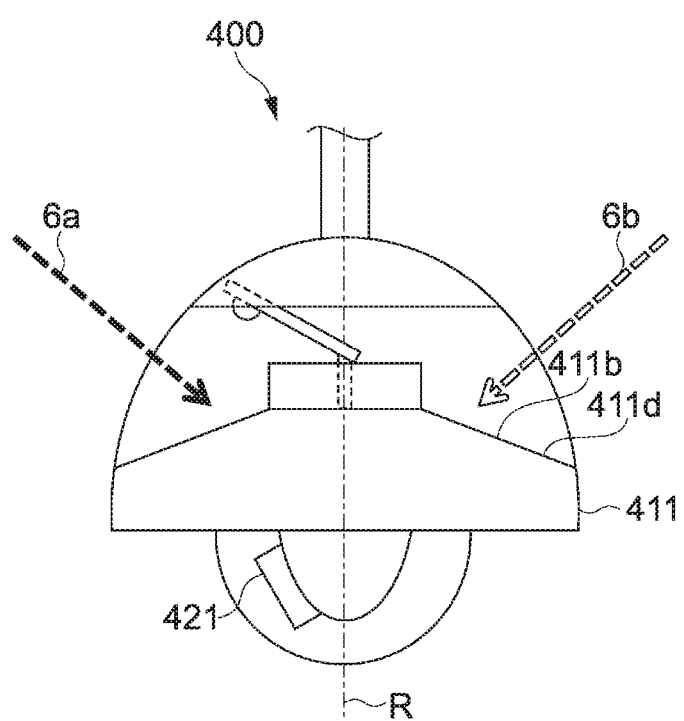
FIG. 15 schematically illustrates an example of a configuration of a monitoring camera according to another embodiment.

FIG. 15 schematically illustrates an example of a configuration of a monitoring camera according to another embodiment of the present technology. In a monitoring camera 400 illustrated in FIG. 15, an upper face 411b of a base portion 411 includes a tapered surface 411d that is tilted in a direction away from the rotational axis R of a main camera 421. The tapered surface 411d is provided to be tilted downward in the direction away from the rotational axis R.

A white plate 430 is provided on the tapered surface 411d of the upper face 411c. Thus, in the present embodiment, the tapered surface 411d tilted downward in the direction away from the rotational axis R serves as a subject for calibration.

The formation of such a tapered surface 411d makes it possible to efficiently let in the illumination light 6 from a light source situated on a side toward which the main camera 421 is oriented (the first illumination light 6a in the example illustrated in FIG. 15). Further, it is possible to place sufficient restrictions on the illumination light 6 from a light source situated on a side opposite to the side toward which the main camera 421 is oriented (the second illumination light 6b in the example illustrated in FIG. 15). This results in being able to accurately adjust, for example, a white balance or an ISO speed according to a property of illumination light illuminating an image-shooting range.

Figure 16A:
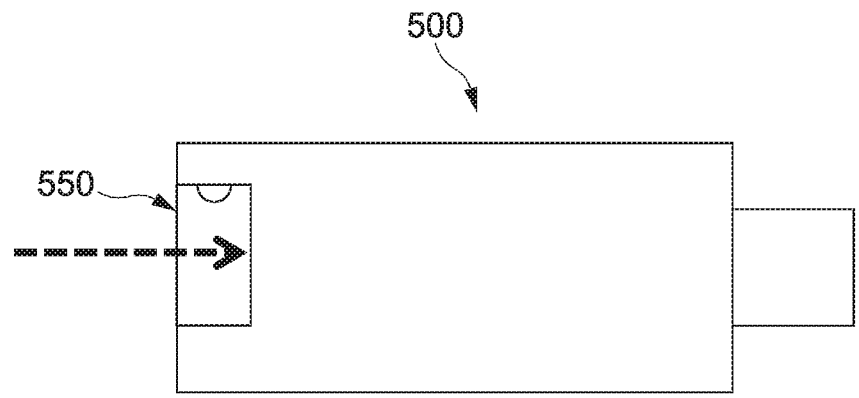
FIGS. 16A and 16B schematically illustrate an example of a configuration of a monitoring camera according to another embodiment.
Figure 16B:
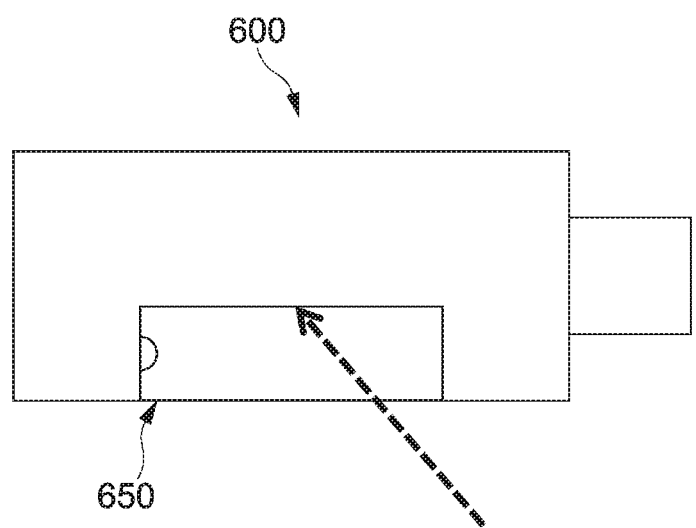

FIGS. 16A and 16B schematically illustrate an example of a configuration of a monitoring camera according to another embodiment of the present technology. As in the case of a monitoring camera 500 illustrated in FIG. 16A, a lighting section 550 may be provided to a lateral portion of a casing 510. Alternatively, as in the case of a monitoring camera 600 illustrated in FIG. 16B, a lighting section 650 may be provided to a lower portion of the casing 510. The position at which a lighting section is provided may be designed according to, for example, a positional relationship with a light source and a monitoring area, or the orientation of the monitoring camera when image-shooting is performed on the monitoring area.

At least two of the features of the present technology described above can also be combined. In other words, various features described in the respective embodiments may be optionally combined regardless of the embodiments.

Further, the various effects described above are not limitative but are merely illustrative, and other effects may be provided.

Note that the present technology may also take the following configurations.

(1) An image-capturing apparatus including:
  a camera;
  a lighting section that includes a light entrance that at least a portion of external light enters, and an object for calibration that is irradiated with the external light entering the light entrance;
  a sensor section that detects a state of the object for calibration irradiated with the external light; and
  an image-shooting controller that controls the camera according to a result of the detection performed by the sensor section.

(2) The image-capturing apparatus according to (1), in which
  the external light includes illumination light that is emitted from a light source that illuminates an image-shooting range of the camera.

(3) The image-capturing apparatus according to (1) or (2), further including a change section that is capable of changing an image-shooting direction of the camera, in which
  according to the image-shooting direction changed by the change section, the sensor section variably sets, with respect to the object for calibration, a detection region that is a detection target.

(4) The image-capturing apparatus according to (3), in which
  the change section rotates the camera about a specified axis,
  the object for calibration is arranged to surround the specified axis, and
  the sensor section includes a sensor that is rotatable about the specified axis, and rotates the sensor such that a rotational position of the sensor with respect to the specified axis substantially coincides with a rotational position of the camera with respect to the specified axis.

(5) The image-capturing apparatus according to (3) or (4), in which
  the change section rotates the camera about a specified axis,
  the object for calibration is arranged to surround the specified axis, and
  the sensor section sets, to be the detection region, a region of the object for calibration depending on a rotational position of the camera with respect to the specified axis.

(6) The image-capturing apparatus according to (4) or (5), in which
  the subject for calibration includes a tapered surface that is tilted in a direction away from the specified axis.

(7) The image-capturing apparatus according to any one of (1) to (6), in which
  the sensor section includes a camera for detection that performs image-shooting on the object for calibration, and
  the image-shooting controller controls the camera using an image signal generated by the camera for detection.

(8) The image-capturing apparatus according any one of (1) to (7), in which
  the image-shooting controller controls at least one of a white balance or an ISO speed of an image shot using the camera.

(9) The image-capturing apparatus according to any one of (1) to (8), further including a casing that includes an upper portion and a lower portion, in which
  the light entrance is provided to the upper portion of the casing.

(10) The image-capturing apparatus according to (9), in which
  the casing includes a lateral portion, and
  the camera is provided to the lower portion or the lateral portion.

(11) The image-capturing apparatus according to any one of (1) to (10), in which
  the object for calibration includes a white plate.

(12) The image-capturing apparatus according to any one of (1) to (11), in which
  the external light includes sunlight.

REFERENCE SIGNS LIST

D detection region
R rotational axis
S image-shooting region
5 light source
6 illumination light
10, 310, 510 casing
15, 315 lighting window
20, 320, 420 main camera module
21, 321, 421 main camera
22, 44 drive section
26 image generator
27 WB detector
28 image processing section
30, 330, 430 white plate
40, 340 sub-camera module
41, 341 sub-camera
60, 260 system controller
100, 200, 300, 400, 500, 600 monitoring camera
240 360-degree-camera module
241 360-degree camera
350, 550, 650 lighting section

The invention claimed is:

1. An image-capturing apparatus, comprising:
  a first camera;
  a lighting part that includes:
    a light entrance configured to receive at least a portion of external light; and
    an object for calibration that is irradiated with the received at least the portion of the external light;
  an actuator configured to change an image-shooting direction of the first camera;
  a sensor configured to:
    set, as a detection target, a detection region on the object for calibration based on the change in the image-shooting direction of the first camera; and
    detect a state of the object for calibration; and
  a central processing unit (CPU) configured to control the first camera based on a result of the detection of the state of the object for calibration.

2. The image-capturing apparatus according to claim 1, wherein
  the at least the portion of the external light received by the light entrance includes illumination light, and
  the illumination light is emitted from a light source that illuminates an image-shooting range of the first camera.

3. The image-capturing apparatus according to claim 1, wherein
  the actuator is further configured to rotate the first camera about a specific axis,
  the object for calibration is arranged to surround the specific axis, the sensor is rotatable about the specific axis, and
a rotational position of the sensor with respect to the specific axis substantially coincides with a rotational position of the first camera with respect to the specific axis.

4. The image-capturing apparatus according to claim 1, wherein
the actuator is further configured to rotate the first camera about a specific axis,
the object for calibration is arranged to surround the specific axis, and
the sensor is further configured to set the detection region based on a rotational position of the first camera with respect to the specific axis.

5. The image-capturing apparatus according to claim 1, wherein the object for calibration includes a tapered surface that is tilted in a direction away from a specific axis.

6. The image-capturing apparatus according to claim 1, wherein
the sensor includes a second camera configured to capture a first image of the object for calibration, and
the CPU is further configured to control the first camera based on the first image.

7. The image-capturing apparatus according to claim 1, wherein
the first camera is configured to capture a second image, and
the CPU is further configured to control at least one of a white balance or an ISO speed of the second image.

8. The image-capturing apparatus according to claim 1, further comprising a casing that includes an upper portion and a lower portion, wherein the light entrance is at the upper portion of the casing.

9. The image-capturing apparatus according to claim 8, wherein
the casing further includes a lateral portion, and
the first camera is at one of the lower portion or the lateral portion.

10. The image-capturing apparatus according to claim 1, wherein the object for calibration includes a white plate.

11. The image-capturing apparatus according to claim 1, wherein the at least the portion of the external light received by the light entrance includes sunlight.

12. An image-capturing apparatus, comprising:
a first camera;
a lighting part that includes:
a light entrance configured to receive at least a portion of external light; and
an object for calibration that is irradiated with the received at least the portion of the external light;
a sensor that includes a second camera, wherein
the sensor is configured to detect a state of the object for calibration, and
the second camera is configured to capture a first image of the object for calibration; and
a central processing unit (CPU) configured to control the first camera based on the captured first image and a result of the detection of the state of the object for calibration.

13. The image-capturing apparatus according to claim 12, wherein
the first camera is configured to capture a second image, and
the CPU is further configured to control at least one of a white balance or an ISO speed of the second image.

14. The image-capturing apparatus according to claim 12, further comprising a casing that includes an upper portion and a lower portion, wherein the light entrance is at the upper portion of the casing.

15. The image-capturing apparatus according to claim 14, wherein
the casing further includes a lateral portion, and
the first camera is at one of the lower portion or the lateral portion.

16. The image-capturing apparatus according to claim 12, wherein the object for calibration includes a white plate.

17. The image-capturing apparatus according to claim 12, wherein
the at least the portion of the external light received by the light entrance includes illumination light, and
the illumination light is emitted from a light source that illuminates an image-shooting range of the first camera.

18. The image-capturing apparatus according to claim 12, wherein the at least the portion of the external light received by the light entrance includes sunlight.

* * * * *